Figure 1A:
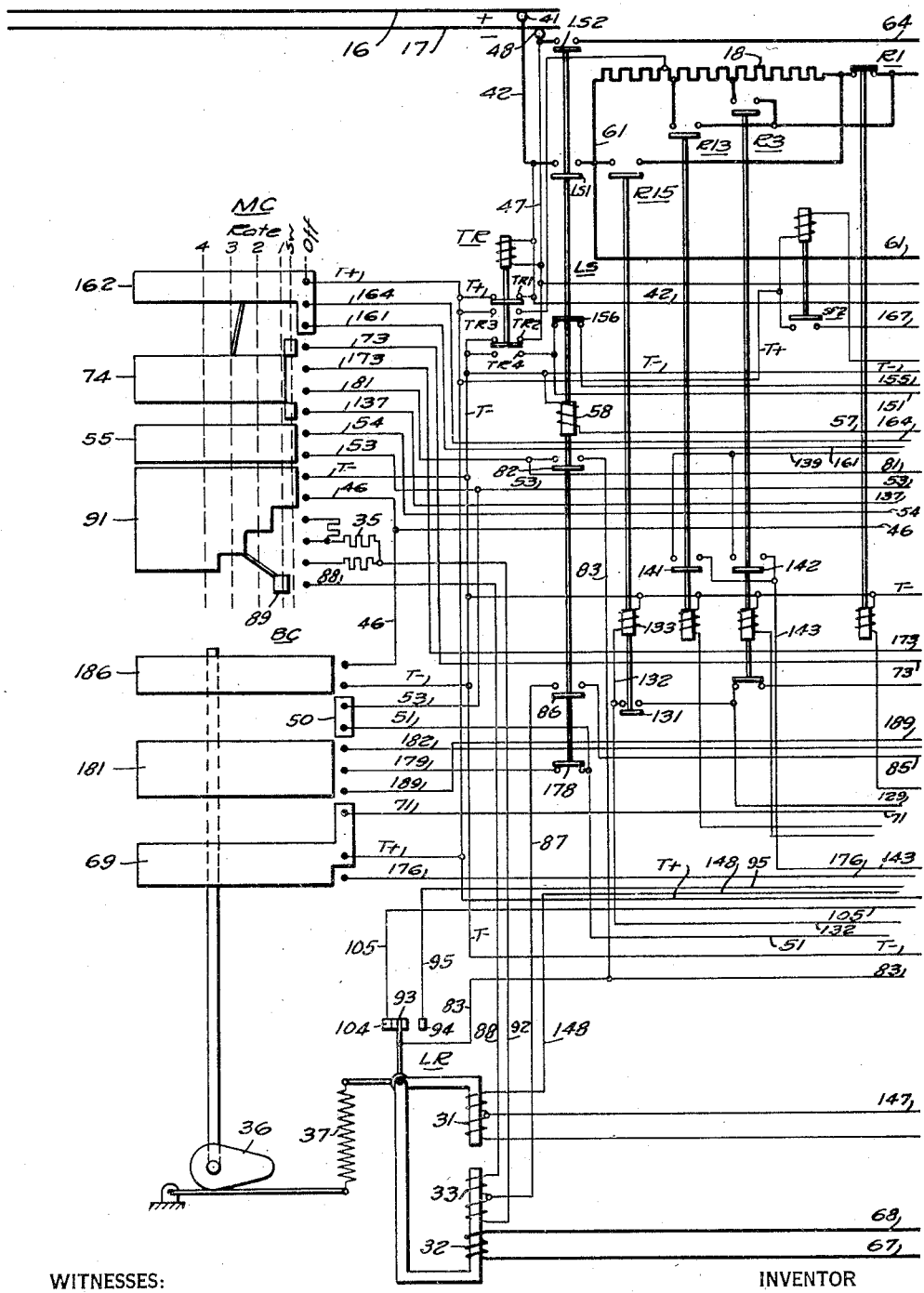

Oct. 25, 1938.    B. O. AUSTIN    2,134,545
MOTOR CONTROL SYSTEM
Filed June 2, 1937    4 Sheets-Sheet 1

WITNESSES:    INVENTOR
    Bascum O. Austin.
    BY
    ATTORNEY

Oct. 25, 1938.   B. O. AUSTIN   2,134,545
MOTOR CONTROL SYSTEM
Filed June 2, 1937   4 Sheets-Sheet 4

WITNESSES:   INVENTOR
   Bascum O. Austin.
   ATTORNEY

Patented Oct. 25, 1938

2,134,545

UNITED STATES PATENT OFFICE 2,134,545

MOTOR CONTROL SYSTEM

Bascum O. Austin, Forest Hills, Pa., assignor to Westinghouse Electric & Manufacturing Company, East Pittsburgh, Pa., a corporation of Pennsylvania Application June 2, 1937, Serial No. 145,952

18 Claims. (Cl. 172—179)

My invention relates, generally, to motor control systems and more particularly to systems for controlling the acceleration and the deceleration of electrically propelled vehicles.

An object of the invention, generally stated, is to provide a system for automatically controlling both the acceleration and the deceleration of an electrically propelled vehicle which shall be simple and efficient in operation and which may be economically manufactured and installed.

A more specific object of the invention is to accelerate and decelerate an electrically propelled vehicle in a smooth manner.

Another object of the invention is to provide for dynamically braking an electric vehicle without the use of electric power from an external source.

A further object of the invention is to increase the initial speed of operation of control apparatus for automatically controlling the acceleration and the deceleration of an electric vehicle.

Still another object of the invention is to provide for an immediate response of dynamic braking when applied while the vehicle is coasting.

A still further object of the invention is to operate a plurality of sequence switches or controllers in tandem electrically for automatically controlling the acceleration and deceleration of an electric vehicle.

Another object of the invention is to prevent the generation of excessive voltages during coasting of the vehicle at high speeds.

A further object of the invention is to provide for establishing dynamic braking independently of the position of the accelerating or master controller for an electric vehicle.

Other objects of the invention will be explained fully hereinafter or will be apparent to those skilled in the art.

According to one embodiment of the invention, both the acceleration and the deceleration of the propelling motors of an electric vehicle are controlled by a pair of sequence switches which are operated in tandem electrically to control the amount of resistance in the motor circuits. The sequence switches always operate one at a time, following each other. The motors are provided with separately excited or tickler field windings, in addition to the usual series field windings, which are energized during coasting and dynamic braking to control the voltage generated by the motors. In the event that the power supply to the car is lost, energy is obtained from the motors for operating the control apparatus, thereby permitting the car to be kept under control and dynamic braking applied. The master controller and the braking controller are so interlocked that dynamic braking can be applied independently of the position of the master controller. The position of the sequence switch during coasting is changed in accordance with the speed of the car to insure an immediate response of the dynamic brake.

Figure 1B:
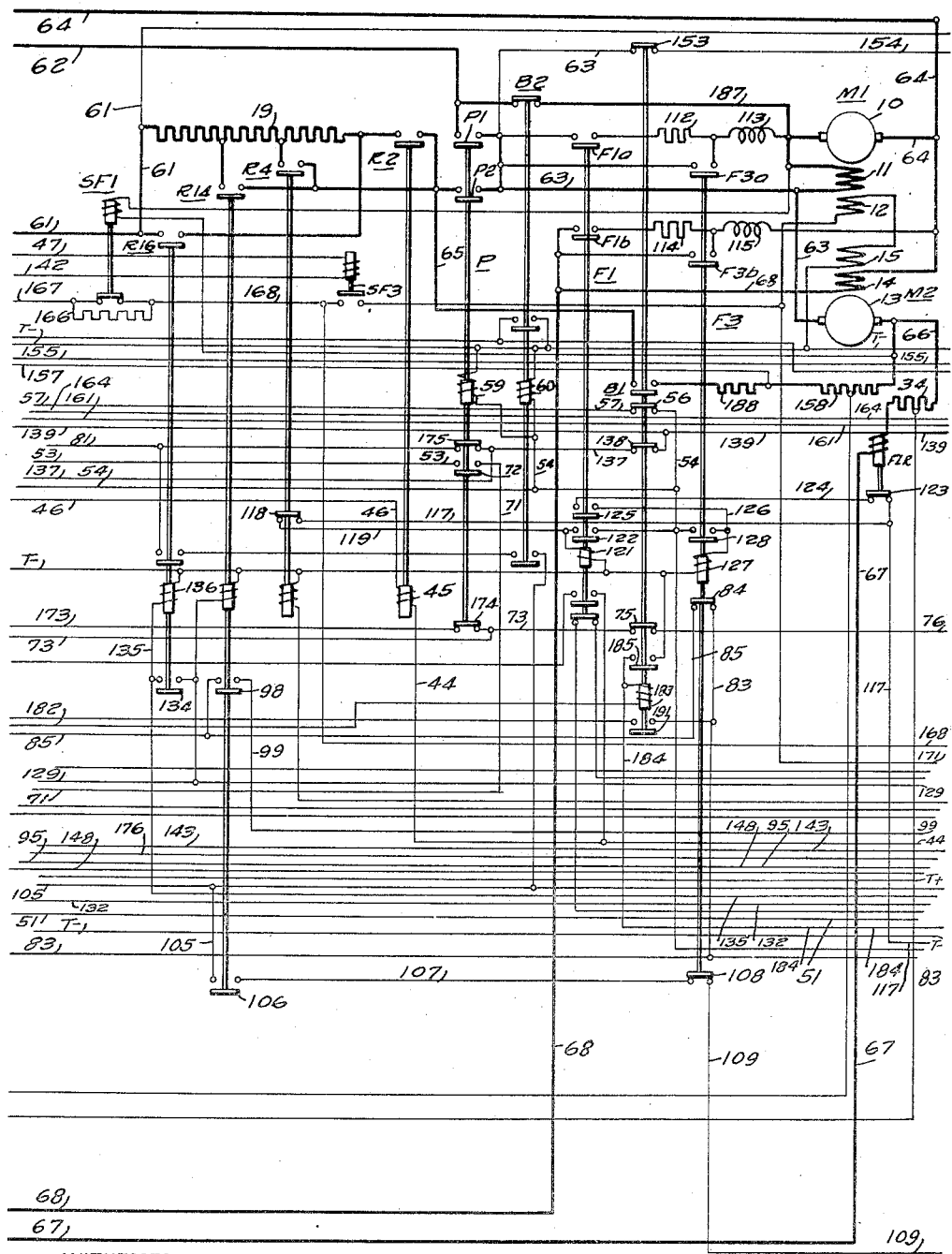
Figure 1C:
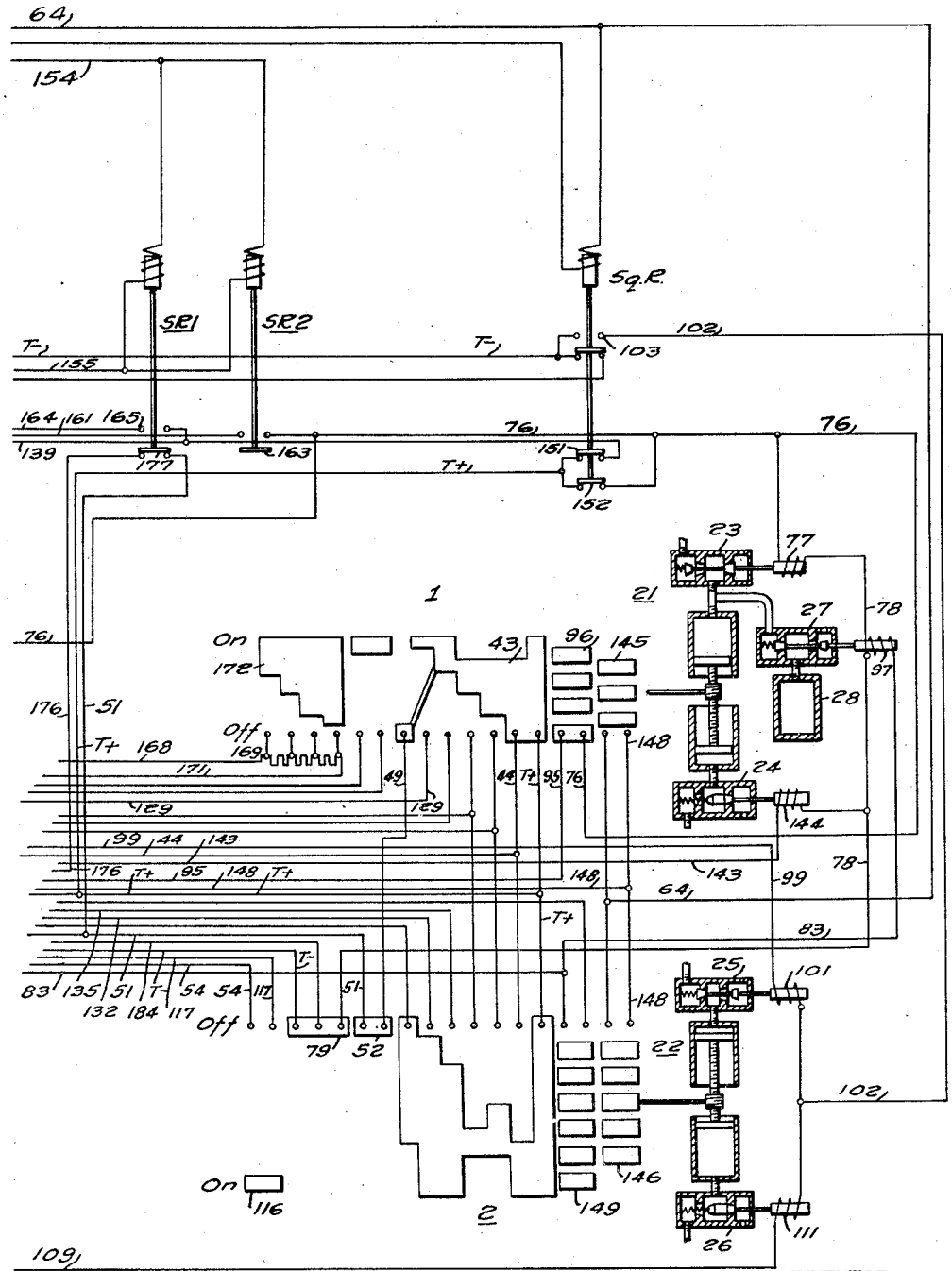
Figures 2, 3, 4:
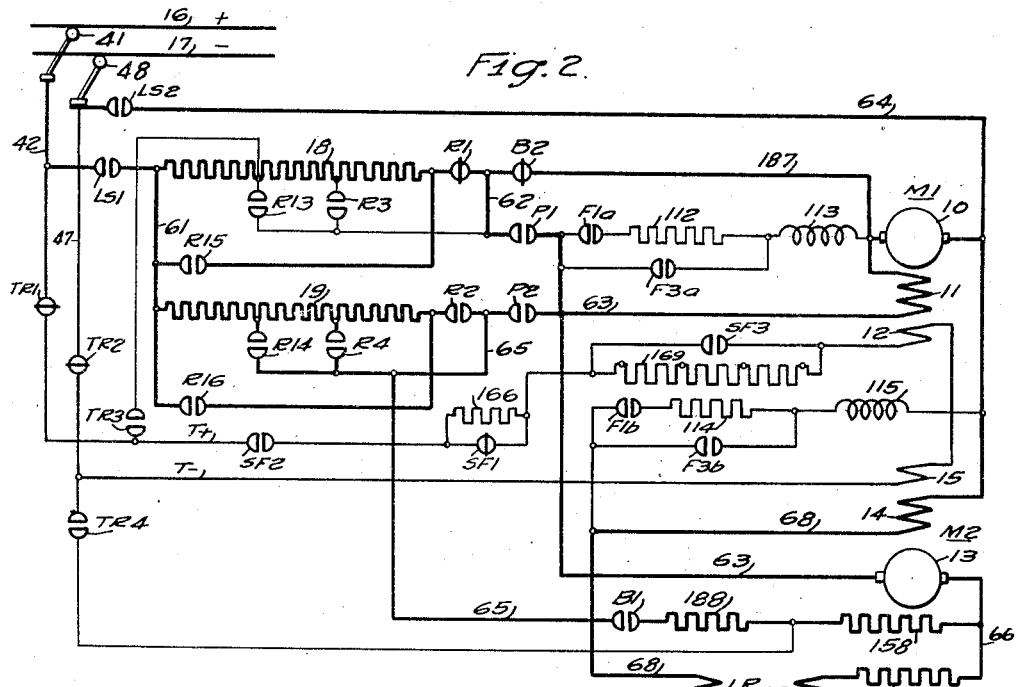

For a fuller understanding of the nature and objects of the invention, reference may be had to the following detailed description, taken in conjunction with the accompanying drawings, in which:

Figures 1A, 1B and 1C, when combined, constitute a diagrammatic view of a control system embodying the invention;

Fig. 2 is a schematic diagram showing the main circuit connections for the motors and control apparatus, and Figs. 3 and 4 are charts showing the sequence of operation of a portion of the apparatus illustrated in Figs. 1 and 2.

Referring now to the drawings, the system shown therein controls a pair of motors M1 and M2, which may be of a type suitable for propelling a vehicle, such as a street car (not shown). The motor M1 is provided with an armature winding 10, a series field winding 11 and a separately excited field winding 12, which is utilized to aid in building up the dynamic braking effect quickly and also provides means of obtaining sufficient voltage from the motors, as shunt generators, to operate the control equipment when the trolley voltage is not available. Likewise, the motor M2 is provided with an armature winding 13, a series field winding 14 and a separately excited field winding 15.

As usual, power for operating the motors M1 and M2 may be supplied through trolley conductors 16 and 17, which may be connected to any suitable source of power, such as a power generating station (not shown). The motors may be connected to the power conductors in parallel-circuit relation by means of a line switch LS and a paralleling switch P. A plurality of resistor shunting switches R1, R2, R3, R4, R13, R14, R15 and R16 are provided for controlling the portions of resistors 18 and 19 which are connected in the motor circuits both during acceleration and dynamic braking of the vehicle. A pair of switches B1 and B2 are utilized to establish dynamic braking connections for the motors. Field shunting switches F1 and F3 are provided for shunting the series field windings of the motors at the end of the accelerating cycle, in order to attain maximum speed of the vehicle.

In order to control the current supply to the separately excited field windings, three contactors, which are designated as SF1, SF2 and SF3, are provided. The actuating coil of the SF1 contactor is so connected across the main motors that when the generated voltage of the motors rises above a predetermined amount, as, for example, 600 volts, during coasting, this contactor opens and inserts resistance in series with the separately excited field windings, thereby reducing the generated voltage to a safe value. The SF2 contactor is utilized to open and close the power supply to the separately excited field windings. Its actuating coil is so interlocked in the control circuits as to open this switch when the car is at rest or when power is on the motors. Additional interlocks are provided in the circuit of this switch to close it when coasting or when dynamic braking is being used. The actuating coil of the SF3 contactor is connected across line voltage. Loss of this voltage causes the contactor to close, shunting a resistance in series with the separately excited field winding. This enables the generated voltage of the main motors to be built up to a value which will operate the control apparatus when the car is running at a low speed and line voltage is not available.

The operation of the resistor shunting switches and the field shunting switches is controlled by two sequence drums 1 and 2, which are driven by air engines 21 and 22, respectively. As explained hereinbefore, the sequence drums always operate one at a time, or in tandem, following each other. There is no instant when the two sequence drums operate simultaneously under normal conditions. The air engine 21 is controlled by magnet valves 23 and 24, and the air engine 22 is controlled by magnet valves 25 and 26, which may be of the usual type.

In addition to the valves 23 and 24, the number 1 sequence switch is provided with a volume valve 27. The purpose of this valve is to exhaust air for a short time from one end of the operating cylinder into an auxiliary chamber 28 to cause the switch to start moving quickly. The valve 27 functions both during acceleration and braking to increase the starting speed of the one switch.

A master controller MC and a braking controller BC are provided for controlling the accelerating and the braking operations, respectively. Both controllers are of the drum type and they are so interlocked that regardless of the position in which the master controller may be, the operation of the braking controller removes power from the motors and applies dynamic braking.

The automatic progression of the sequence drums is under the control of a limit relay LR. The relay comprises an iron magnetic circuit having three coils 31, 32 and 33. The moving coil 31, which is mounted on the armature of the relay, is energized from a shunt 34 in the motor circuit. The remaining two coils 32 and 33 are stationary coils mounted on the main magnetic circuit of the relay. The main series coil 32 is in series with one of the motors. This coil provides flux in the relay in proportion to the current in one of the motors. The third coil 33 is a shunt coil which is used to change the setting of the relay by the operation of the master controller. This shunt coil is energized from the line and is commutated with a resistance 35 in series with the coil. The commutation of this coil takes place at the master controller when it is actuated to one of the rate positions, that is, positions 1, 2, 3 or 4. The flux of the shunt coil 33 opposes the flux of the series coil 32 and in this manner, the current required to operate the relay is changed by the manipulation of the master controller. The limit relay is adjusted to give the proper accelerating rate at the different positions of the master controller.

In order to change the setting of the limit relay during braking, the braking controller BC is provided with a cam 36, disposed to increase the tension on a spring 37 which is connected to the armature of the limit relay. In this manner, the current required to operate the relay is also changed by the manipulation of the braking controller.

The operation of the field shunting switch F3 is controlled by a field limit relay FLR, the actuating coil of which is connected in the main motor circuit. In this manner, the field shunting switch F3 is prevented from closing until the current in the field limit relay has decreased to a predetermined value.

In order to provide for operating the control equipment to make it possible to apply dynamic braking in the event that the power supply to the car is lost, a transfer relay TR is provided for transferring the control supply to the main motors when the power supply fails. The actuating coil of the transfer relay is connected across line potential and its contact members are disposed to transfer the control supply from across the main power conductors to across the motors in case of failure of line voltage.

Two spotting relays SR1 and SR2 are provided for controlling the position of the No. 1 sequence switch during coasting. The actuating coils of these relays are connected across the voltage of the main motors when the car is coasting. Therefore, the relays are responsive to the speed of the car and the contact members of the relays are so connected in the circuits for the magnet valves of the No. 1 sequence switch that the position of the drum matches the speed of the car. In this manner, the sequence switch is in the proper position to get immediate dynamic braking at any car speed.

With a view to returning both sequence switches to the "off" position when the car comes to rest, a sequence relay Sq. R is provided. The actuating coil of this relay is connected across the voltage of the main motors, and it has contact members which control the operation of the air engines which drive the sequence drums. The relay is also provided with contact members which control the operation of the contactor SF2 to open the separately excited field winding circuit when the car is at rest, as explained hereinbefore.

In order that the functioning of the foregoing apparatus may be more clearly understood, the operation of the control system will now be described in more detail. Assuming that it is desired to connect the motors M1 and M2 to the power source in order to propel the vehicle, the controller MC is actuated to the "switching" position, thereby establishing energizing circuits for closing the switches LS, P and R2. As shown, the switch R1 is already closed, since it is of a type in which its main contact members are closed when the coil of the switch is deenergized.

The energizing circuit for the actuating coil of the switch R2 may be traced from the positive power conductor 16 through a current collector 41, conductor 42, the contact members TR1 of the transfer relay TR and conductor T+ to the segment 43 of the No. 1 sequence switch, conductor 44, the actuating coil 45 of the switch R2 and conductor 46 to the controller MC, thence through a conductor T—, the contact members TR2 of the transfer relay TR, a conductor 47, and a current collector 48 to the negative power conductor 17.

The energizing circuit for the actuating coil of the switch LS may be traced from a conductor 49, which is energized from the conductor T+ through the contact segment 43 of the No. 1 sequence switch, to a conductor 51, which is energized through a segment 52 on the No. 2 sequence switch, conductor 53, which is energized through a segment 50 on the braking controller BC, conductor 54, which is energized through a segment 55 on the controller MC, an interlock 56 on the switch B1, conductor 57, and the actuating coil 58 of the switch LS to the negative control conductor T—.

The energizing circuit for the actuating coil of the switch P extends from the previously energized conductor 54 through the coil 59 of the switch P to the conductor T—.

At this time the switch B2 is held open since its actuating coil 60 is energized through a circuit which extends from the conductor 54 through the coil 60 to the conductor T—.

The closing of the switches LS, P, R1 and R2 connects the motors to the power source in parallel-circuit relation. The circuit through the motor M1 may be traced from the positive power conductor 42 through the contact members LS1 of the switch LS, conductor 61, the resistor 18, the switch R1, conductor 62, the contact members P1 of the switch P, conductor 63, the series field winding 11 and the armature winding 10 of the motor M1, conductor 64, and contact members LS2 of the switch LS to the negative power conductor 47.

The circuit through the motor M2 extends from the conductor 61 through the resistor 19, the switch R2, conductor 65, the contact members P2 of the switch P, conductor 63, the armature winding 13 of the motor M2, conductor 66, the shunt 34, the actuating coil of the field limit relay FLR, conductor 67, the series coil 32 of the limit relay LR, conductor 68, the series field winding 14 of the motor M2, conductor 64, and the contact members LS2 of the switch LS to the negative power conductor 47.

The closing of the switch P also establishes a holding circuit to maintain the conductor 53 energized after the sequence drums start rotating. This circuit may be traced from the positive control conductor T+ through a contact segment 69 on the controller BC to conductor 71, and an interlock 72 on the switch P to conductor 53.

At this time, the magnet valve 23 of the No. 1 sequence drum is energized to hold the drum in the "off" position. The circuit for the actuating coil of the magnet valve 23 may be traced from a conductor 73, which is energized from the conductor T+ through a segment 74 on the controller MC, through an interlock 75 on the switch B1, conductor 76, the actuating coil 77 of the magnet valve 23, conductor 78, and a contact segment 79 on the No. 2 sequence drum to the negative control conductor T—.

If it is desired to shunt the resistors 18 and 19 from the motor circuits to accelerate the motors, the controller MC is actuated to one of the rate positions "1", "2", "3" or "4" to cause the No. 1 sequence drum to be operated by the air engine 21.

As explained hereinbefore, the rate of acceleration of the car is determined by the position of the controller MC, which in turn controls the energization of the coil 33 on the limit relay LR to govern the operation of the relay. Thus if the controller MC is set on position "1", only a portion of the coil 33 is energized, the circuit for which may be traced from a conductor 81, which is energized through the segment 74 on the controller MC, through an interlock 82 on the switch LS, conductor 83, an interlock 84 on the switch F3, conductor 85, an interlock 86 on the switch LS, conductor 87, the upper portion of the coil 33 on the relay LR, conductor 88, and the segments 89 and 91 of the controller MC to the negative control conductor T—. If the controller is actuated to one of the higher rate positions "2", "3" or "4", the lower portion of the coil 33 on the relay LR is energized through a conductor 92 and certain portions of the resistor 35, which are connected in the circuit in accordance with the position of the controller MC, thereby governing the operation of the relay LR to change the rate of acceleration of the vehicle as desired.

When the controller MC is actuated to the first rate position, the conductor 73 is deenergized which deenergizes the magnet valve 23, thereby permitting air to be exhausted from the air engine to operate the No. 1 sequence drum. As shown, the magnet valve 24 is of the type which permits air to enter the air engine when the valve is deenergized.

As described hereinbefore, actuating the controller to position "1" energizes the conductor 83, which supplies energy to the intermediate contact member 93 of the limit relay LR. Therefore, if the motor current increases sufficiently to operate the relay to cause the contact member 93 to engage the contact member 94, thereby energizing a conductor 95, the magnet valve 23 is energized to stop the sequence drum. The energizing circuit for the magnet valve 23 may be traced from the conductor 95 through one of the contact segments 96 on the No. 1 sequence drum to conductor 76, and thence through the coil 77 to the negative conductor T— through a circuit previously traced.

In this manner, the sequence switch is stopped until the current becomes low enough to permit the circuit between the contact members 93 and 94 of the limit relay to be broken. The sequence switch will then progress until the current reaches a sufficient value to stop it again. This action continues until the No. 1 sequence switch reaches the "on" position. While the sequence drum is traveling from the "off" to the "on" position, the resistor shunting switches R4, R13 and R14 are being closed in the order indicated by the sequence chart shown in Fig. 3, thereby shunting portions of the resistors 18 and 19 from the motor circuit step by step in a manner well known in the art.

As explained hereinbefore, the volume valve 27 is energized when the controller MC is actuated to position "1", thereby permitting air to be exhausted rapidly from the cylinder of the air engine 21 into an auxiliary chamber 28, which increases the speed of the piston of the air engine for a short time until the air pressure in the cylinder 28 becomes too great after which time the piston travels at its normal speed under the control of the magnet valves 23 and 24. The energizing circuit for the actuating coil of the magnet valve 27 extends from the previously energized conductor 83 through the actuating coil 97 to conductor 78, and thence to the negative conductor T— through a circuit previously traced.

When the No. 1 sequence switch has advanced to the "on" position, interlocks on the resistor shunting switch R14, which, as shown on the sequence chart, is the last one to be closed by the No. 1 sequence drum, energize the inverted and the standard magnet valves on the No. 2 sequence switch, thereby causing this switch to advance toward the "on" position. The energizing circuit for the actuating coil of the magnet valve 25 may be traced from the previously energized conductor 85 through an interlock 98 on the switch R14, conductor 99, the actuating coil 101, conductor 102, and contact members 103 on the sequence relay Sq. R. to the negative conductor T—. The energizing circuit for the actuating coil of the magnet valve 26 extends from the previously energized conductor 83 through contact members 93 and 104 of the limit relay LR, conductor 105, an interlock 106 of the switch R14, conductor 107, an interlock 108 on the switch F3, conductor 109 and the actuating coil 111 to the conductor 102, and thence through a circuit previously traced to the negative conductor T—.

If the current in the motors increases sufficiently to operate the limit relay while the No. 2 sequence switch is progressing, the circuit through the contact members 93 and 104 is broken. The opening of this circuit causes the inverted magnet valve 26 to be deenergized, thereby admitting air to the cylinder of the air engine to stop the progression of the switch. When the current becomes small enough to permit the relay to close the contact members 93 and 104, the sequence switch again progresses until the motor current is sufficient to operate the relay. This operation continues until the No. 2 sequence switch has reached the "on" position, thereby closing the resistor shunting switches R15 and R16 and reclosing the switches R3, R4, R1 and R2 in the order shown in the sequence chart illustrated in Fig. 3, thereby completely shunting the resistors 18 and 19 from the motor circuit.

At the last position of the No. 2 sequence switch, the field shunting switch F1 is closed to establish shunting circuits for the series field windings 11 and 14 of the motors M1 and M2, respectively. The shunting circuit for the field winding 11 extends from the conductor 63 through contact members F1a of the switch F1, a resistor 112 and a reactor 113 to the armature winding 10 of the motor M1. The shunting circuit around the field winding 14 extends from the conductor 69, which is connected to one terminal of the winding 14, through contact members F1b of the switch F1, a resistor 114 and a reactor 115 to the conductor 64, which is connected to the other terminal of the series field winding 14.

The energizing circuit for the actuating coil of the switch F1 may be traced from the previously energized conductor 54 through a segment 116 on the sequence drum to a conductor 117, an interlock 118 on the switch R4, conductor 119, and the actuating coil 121 of the switch F1 to the negative conductor T—. A holding circuit is provided for the switch F1, which extends from the conductor 54, through an interlock 122 on the switch F1 to the coil 121.

Following the closing of the switch F1, the actuating coil of the switch F3 is energized, provided the contact members of the field limit relay FLR are closed. In this manner, the switch F3 is closed to shunt the resistors 112 and 114 from the field shunting circuits. However, the switch F1 does not close until the motor current has decreased to a value which permits the field limit relay to close its contact members. The energizing circuit for the actuating coil of the switch F3 extends from the previously energized conductor 117 through the contact members 123 of the relay FLR, conductor 124, an interlock 125 on the switch F1, conductor 126, and the actuating coil 127 of the switch F3 to the conductor T—. A holding circuit is established for the switch F3 which extends from a conductor 54 through an interlock 128 to the actuating coil 127.

The closing of the switch F3 causes the magnet valves 25 and 26 to be deenergized by the opening of the circuits through the interlocks 84 and 108 on the switch F3, thereby causing the No. 2 sequence switch to return to the "off" position immediately. However, the resistor shunting switches R15 and R16 are held closed by holding circuits until the master controller MC is actuated to either the switching or the "off" position to cause the No. 1 sequence drum to return toward its "off" position. The holding circuit for the switch R15 extends from a conductor 129, which is energized through the contact segment 43 of the No. 1 sequence drum, through an interlock 131 on the switch R15, conductor 132 and the actuating coil 133 to the conductor T—. The holding circuit for the switch R16 extends from the conductor 129 through an interlock 134 on the switch R16, conductor 135, and the actuating coil 136 to the conductor T—.

The operation of getting the motors connected directly to the power source is now completed, and the No. 2 sequence switch has completed its cycle of operation. As explained hereinbefore, in case the master controller MC is actuated to the second, third or fourth positions during the acceleration of the motors, the current in the rate coil 33 on the limit relay LR is varied by means of the resistor 35, thereby changing the rate of acceleration of the vehicle at the will of the operator.

When the master controller is returned to the switching position, the conductor 73 and also a conductor 137 are energized to energize the magnet valves of the No. 1 sequence switch, thereby causing the sequence drum to reverse and return toward the "off" position to provide an easy shut-off of the motors by inserting the resistors 18 and 19 in the motor circuit step by step. The circuit for the actuating coil 77 of the magnet valve 23 which extends from the conductor 73 has been previously traced. The energizing circuit for the magnet valve 24 may be traced from the conductor 137 through an interlock 138 on the switch B1, conductor 139, either an interlock 141 on the switch R13 or an interlock 142 on the switch R3, conductor 143, the actuating coil 144 and conductor 78 through a circuit previously traced to the conductor T—.

Thus if the master controller is returned to the switching position during the period of acceleration and either sequence switch is in motion towards the "on" position, it will reverse its direction of motion and provide an easy shut-off of the motors. As explained hereinbefore, the sequence switches always operate one at a time following each other. There is no instance when the two sequence switches operate simultaneously under normal conditions.

As shown, the No. 1 sequence drum is provided with a set of spot contact segments 145, and the No. 2 drum has a similar set of contact segments 146. The purpose of these contact segments is to momentarily energize a portion of the moving coil 31 of the limit relay LR with the voltage across two of the main fields of the motors by means of conductors 147, 148 and 64. The conductors 148 and 64 are connected to contact members of the sequence switch which are bridged by the contact segments 145 and 146. The momentary energization of a portion of the coil 31, which is cumulative with the remainder of the coil, causes the relay to operate rapidly just at the time the sequence switch is advancing a notching position. In this manner, greater sensitivity is provided in stopping the sequence switches at the proper point.

The purpose of the contact segments 96 on the No. 1 sequence drum and a similar set of contact segments 149 on the No. 2 sequence drum is to cause the sequence switches to pass from one notch to another without being stopped by the limit relay between positions. These contact segments are commonly known as "carry-over" contacts and are disposed to bridge the contact members of the limit relay LR.

As explained hereinbefore, the operating coil of the sequence relay Sq. R is connected across the voltage of the main motor. Its contact members 151 and 152 function to energize the magnet valve of the No. 1 sequence switch to cause the switch to return to the "off" position after the line switch is opened to remove power from the motors. As shown, when the actuating coil of the relay is deenergized, the contact members 151 and 152 connect the conductor T+ to the conductors 76 and 139, thereby energizing the magnet valves of the air engine 21 in the manner hereinbefore described.

As described hereinbefore, when the car has completed an acceleration, the No. 1 sequence switch is in the "on" position, and the No. 2 sequence switch is in the "off" position. When power is shut off by returning the controller MC to the "off" position to open the line switch LS, and the car is coasting, the No. 1 sequence drum assumes intermediate positions in accordance with the car speed. During coasting, the No. 2 sequence switch remains in the "off" position, but the No. 1 sequence switch is under the control of the spotting relays SR1 and SR2 in order that the switch will be in the proper position to secure immediate dynamic braking from any car speed. The actuating coils of the spotting relays are connected in parallel-circuit relation across the voltage of the motors while the car is coasting. The energizing circuit for the coils of the spotting relays extends from a conductor 63, through an interlock 153 on the switch B1, conductor 154, the coils of the relays SR1 and SR2, conductor 155, an interlock 156 on the switch LS, a conductor 157, and a resistor 158 to the conductor 66, which is in the motor circuit as previously described. It will be understood that by so adjusting the relays SR1 and SR2 that they operate at different voltages the No. 1 sequence switch may be either advanced or retracted in accordance with the speed of the car. The contact members of the relay SR1 control the operation of the magnet valve 24, and the contact members of the relay SR2 control the magnet valve 23.

Assuming that the car is coasting at a speed to cause the motor to generate sufficient voltage to raise both relays to their uppermost position, both of the magnet valves of the sequence switch are energized, thereby causing the sequence switch to move towards the "off" position. The energizing circuit for the magnet valve 23 may be traced from a conductor 161, which is energized through a contact segment 162 of the controller MC, through a contact member 163 of the relay SR2, conductor 76, the actuating coil 77 and conductor 78 to the negative conductor T— through a circuit previously traced. The energizing circuit for the actuating coil of the magnet valve 24 extends from a conductor 164, which is also energized at the master controller, through the contact member 165 of the relay SR1 to conductor 139, and thence through the coil 144 to the negative conductor T— through a circuit previously traced.

If the speed of the car decreases a certain amount, the magnet valve 24 is deenergized by the opening of the relay SR1 to stop the movement of the sequence drum. If the speed decreases still further, the magnet valve 23 is also deenergized by the opening of the relay SR2, thereby causing the drum to be advanced toward the "on" position. However, if the car again gains in speed a sufficient amount, the relays will both be closed to cause the drum to be actuated toward the "off" position in order that the proper amount of resistance will be available for insertion in the motor circuit in case it is desired to establish dynamic braking.

As indicated on the sequence chart shown in Fig. 3, the switches SF1 and SF2 are closed during coasting, thereby connecting the separately excited field windings 12 and 15 of the motors M1 and M2, respectively, to the conductors T+ and T—. The contactor SF2 is of a type in which its main contact members are closed when the coil is deenergized. As explained hereinbefore the contactor SF1 operates only when the voltage generated by the motors becomes excessive, in which case, a resistor 166 is inserted in the field winding circuit. The circuit for the separately excited field windings may be traced from the positive conductor T+ through the contact members of the switch SF2, conductor 167, the contact members of the switch SF1, conductor 168, a resistor 169, conductor 171, the field windings 12 and 15 to the negative conductor T—.

It will be noted that a contact segment 172 on the No. 1 sequence drum is disposed to shunt the resistor 169 from the field winding circuit step-by-step as the sequence drum moves toward the "on" position. In this manner, the excitation of the motor during coasting is adjusted in accordance with the position of the sequence drum to permit the relays SR1 and SR2 to function to control the position of the drum in accordance with the car speed, as previously described.

As explained hereinbefore, in case of failure of the power supply to the car, as, for example, when one of the current collecting devices becomes removed from the power conductors, the transfer relay TR drops to its lowermost position to connect the control conductors T+ and T— across the motors through its contact members TR3 and TR4, respectively. In this manner, the voltage generated by the motors is utilized for operating the control equipment during coasting or dynamic braking. Also, as previously described, the contactor SF3, the actuating coil of which is connected across the power source, closes its contact members to shunt the resistor 169 from the separately excited field winding circuit in case of failure of the trolley voltage, thereby permitting the motors to generate sufficient voltage to operate the control equipment.

If power is reapplied to the motors by operating the controller MC while the car is coasting, the No. 1 sequence switch immediately returns to its "off" position and then both sequence switches go through their normal cycle of operation before full speed is again reached. As shown, a conductor 173, which is energized at the master controller, is connected to the conductor 73 through an interlock 174 on the switch P, thereby supplying energy to the conductor 73 to operate the magnet valve 23 in the manner hereinbefore described. Likewise, the conductor 81, which is also energized at the master controller, supplies energy to the conductor 137 through an interlock 175 on the switch P1, thereby operating the magnet valve 24 as previously described.

In case it is desired to decelerate the vehicle by means of dynamic braking, the controller BC may be actuated to any one of the braking positions. As explained hereinbefore, the rate of dynamic braking is governed by the limit relay since the position of the master controller and the cam 36 connected thereto determines the tension of the spring 37, which is connected to the relay LR. The operation of the controller BC to a braking position interrupts the supply of control energy to the master controller MC through the segments 50 and 69, thereby causing the switches which connect the motors to the power source to be opened, in case they have not already been opened by moving the controller MC to the "off" position.

The operation of the braking controller establishes energizing circuits for causing the switches R2 and B1 to be closed. As explained hereinbefore, the switches R1, B2, SF1 and SF2 are of the type which are closed when their actuating coils are deenergized. The energizing circuit for the actuating coil of the switch B1 may be traced from the conductor T+ through the contact segment 69 of the controller BC, a conductor 176, contact members 177 of the spotting relay SR1, which is in its lowermost position during braking, conductor 51, an interlock 178 on the switch LS, conductor 179, contact segment 181 on the controller BC, conductor 182, the actuating coil 183, conductor 184 and a segment 79 on the No. 2 sequence drum to the negative conductor T—. A holding circuit is established for the switch B1 which extends from the conductor 184, through an interlock 185 to the conductor T—. The energizing circuit for the switch R2 extends from the conductor T+ through the segment 43 of the No. 1 sequence drum, conductor 44, the actuating coil 45, conductor 46, and a segment 186 of the controller BC to the conductor T—.

The closing of the switches R1, R2, B1 and B2 establishes a dynamic braking circuit for the motors by means of which the motors are caused to function as generators to decelerate the vehicle. The circuit for the motor M1 may be traced from one terminal of the armature winding 10 through a conductor 187, the switch B2, conductor 62, the switch R1, the resistor 18, conductor 61, the resistor 19, the switch R2, conductor 65, the switch B1, resistors 188 and 158, conductor 66, the shunt 34, the actuating coil of the relay FLR, conductor 67, a series coil 32 of the relay LR, conductor 68, the series field winding 14 of the motor M2 and conductor 64 to the other terminal of the armature winding 10. The circuit for the motor M2 may be traced from one terminal of the armature winding 13 through conductor 63, the series field winding 11 of the motor M1, conductor 187, the switch B2, conductor 62, the switch R1, the resistor 18, the conductor 61, the resistor 19, the switch R2, conductor 65, the switch B1 and the resistors 188 and 158 and conductor 66 to the other terminal of the armature winding 13. The closing of the contactors SF1 and SF2 energizes the tickler field windings 12 and 15, during braking, through a circuit previously traced.

During the braking period, the No. 1 sequence switch is advanced to the "on" position immediately followed by the No. 2 sequence switch in the same manner as during the acceleration of the vehicle. As explained hereinbefore, the advancement of the sequence switches causes the operation of the resistor shunting switches to shunt the resistors 18 and 19 from the motor circuit, thereby controlling the motor current and the braking effect on the vehicle. The operation of the sequence switches is automatically controlled by the limit relay LR in the manner hereinbefore described. During braking, the intermediate contact member of the relay LR is energized through a circuit which extends from a conductor 189, which is energized at the controller BC through a contact segment 181, through an interlock 191 on the switch B1, and conductor 83 to the contact member 93 on the relay LR.

In addition to the foregoing apparatus and circuits, a number of interlocks and their associated circuits are shown on the drawings which function in the usual manner to protect the equipment during operation of the vehicle. Inasmuch as this additional apparatus does not particularly relate to the invention herein disclosed, it is believed to be unnecessary to describe its operation in detail.

From the foregoing description, it is apparent that I have provided a control system which will function to both accelerate and decelerate an electric propelled vehicle in a smooth manner, since a large number of accelerating steps may be controlled by means of the two sequence drums, the operation of which is herein described. In order to avoid unduly complicating the present specification, a comparatively few number of accelerating steps have been illustrated. However, it will be understood that the number of accelerating steps may be readily increased over that shown in the present drawings.

Since many modifications may be made in the apparatus and arrangement of parts without departing from the spirit of my invention, I do not wish to be limited other than by the scope of the appended claims.

I claim as my invention:

1. In a motor control system, in combination, a motor for propelling a vehicle, a source of power for the motor, switching means for connecting the motor to the power source to accelerate the vehicle, means for controlling the motor current during acceleration of the vehicle, a controller for controlling the operation of said control means, and means responsive to the speed of the vehicle for controlling the operation of said controller while the motor is disconnected from the power source during coasting of the vehicle.

2. In a motor control system, in combination, a motor for propelling a vehicle, a source of power for the motor, switching means for connecting the motor to the power source to accelerate the vehicle, variable resistance means for controlling the motor current during acceleration of the vehicle, control means for varying the amount of said variable resistance means in the motor circuit, and means responsive to the speed of the vehicle for controlling the operation of said control means while the motor is disconnected from the power source during coasting of the vehicle.

3. In a motor system, in combination, a motor for propelling a vehicle, a source of power for the motor, switching means for connecting the motor to the power source to accelerate the vehicle, a resistor for controlling the motor current during acceleration of the vehicle, means for shunting said resistor from the motor circuit step-by-step, control means for controlling the operation of said shunting means, and means responsive to the speed of the vehicle for controlling the operation of said control means while the motor is disconnected from the power source during coasting of the vehicle.

4. In a motor control system, in combination, a motor for propelling a vehicle, a source of power for the motor, switching means for connecting the motor to the power source to accelerate the vehicle, a resistor for controlling the motor current during acceleration of the vehicle, means for shunting said resistor from the motor circuit step-by-step, a sequence controller for controlling the operation of said shunting means, and relay means responsive to the speed of the vehicle for controlling the operation of said control means while the motor is disconnected from the power source during coasting of the vehicle.

5. In a motor control system, in combination, a motor for propelling a vehicle, a source of power for the motor, switching means for connecting the motor to the power source to accelerate the vehicle, a resistor for controlling the motor current during acceleration of the vehicle, means for shunting said resistor from the motor circuit step-by-step, a controller for controlling the operation of said shunting means, and a pair of relays responsive to the speed of the vehicle for controlling the operation of said controller while the motor is disconnected from the power source during coasting of the vehicle.

6. In a motor control system, in combination, a motor for propelling a vehicle, a source of power for the motor, switching means for connecting the motor to the power source to accelerate the vehicle, said motor having a separately excited field winding disposed to be energized from the power source, means for connecting said field winding to the power source during coasting of the vehicle to cause the motor to generate a voltage proportional to the vehicle speed, means for controlling the motor current during acceleration of the vehicle, and relay means responsive to the voltage of the motor during coasting for controlling the operation of said control means while the motor is disconnected from the power source.

7. In a motor control system, in combination, a motor for propelling a vehicle, a source of power for the motor, switching means for connecting the motor to the power source to accelerate the vehicle, switching means for establishing dynamic braking connections for the motor, control means for controlling the motor current, said control means being normally energized from said power source, and means for energizing said control means by said motor in case of failure of the normal power supply.

8. In a motor control system, in combination, a motor for propelling a vehicle, a source of power for the motor, switching means for connecting the motor to the power source to accelerate the vehicle, switching means for establishing dynamic braking connections for the motor, control means for controlling the motor current, said control means being normally connected to said power source, and means for automatically connecting the control means to the motor in the event of failure of the normal power supply to permit dynamic braking to be applied.

9. In a motor control system, in combination, a motor for propelling a vehicle, a source of power for the motor, means for connecting the motor to the power source to accelerate the vehicle, means for establishing dynamic braking connections for the motor, said motor having a field winding normally connected to the power source during coasting and dynamic braking, and means responsive to the voltage of the power source for connecting said field winding to the motor in case of failure of the normal power supply.

10. In a motor control system, in combination, a motor for propelling a vehicle, a source of power for the motor, means for connecting the motor to the power source to accelerate the vehicle, means for establishing dynamic braking connections for the motor, said motor having a field winding normally connected to the power source during coasting and dynamic braking, means responsive to the voltage of the power source for connecting said field winding to the motor in case of failure of the normal power supply, and means responsive to the voltage of the motor for regulating the current in said field winding during coasting of the vehicle.

11. In a motor control system, in combination, a motor for propelling a vehicle, a source of power for operating the motor, a controller for controlling the operation of the motor, means for operating the controller at a predetermined speed, and means for increasing the speed of the controller during the starting of its movement.

12. In a motor control system, in combination, a motor for propelling a vehicle, a source of power for operating the motor, a controller for controlling the operation of the motor, fluid-pressure actuated means for operating the controller at a predetermined speed, and means for increasing the initial rate of movement of the fluid-pressure actuated means to start the controller quickly.

13. In a motor control system, in combination, a motor for propelling a vehicle, a source of power for operating the motor, a controller for controlling the operation of the motor, a fluid-pressure actuated piston for operating the controller, a cylinder for housing said piston, fluid valves for controlling the operation of the piston in the cylinder, an auxiliary chamber, and valve means for connecting said chamber to said cylinder to permit quick starting of the controller.

14. In a motor control system, in combination, a motor for propelling a vehicle, a source of power for operating the motor, a pair of controllers for controlling the operation of the motor, means for operating said controllers, and means for so controlling said operating means that the controllers are operated in sequential relation.

15. In a motor control system, in combination, a motor for propelling a vehicle, a source of power for operating the motor to accelerate the vehicle, means for establishing dynamic braking connections for the motor to decelerate the vehicle, a pair of controllers for controlling the operation of the motor both during acceleration and deceleration of the vehicle, means for operating said controllers, and means for so controlling said operating means that the controllers are operated in sequential relation.

16. In a motor control system, in combination, a motor for propelling a vehicle, a source of power for operating the motor, control apparatus for controlling the operation of the motor, a pair of sequence switches for controlling the operation of said control apparatus, means for operating said sequence switches, and means associated with said control apparatus and said sequence switches for so controlling said operating means that the sequence switches are operated in sequential relation.

17. In a motor control system, in combination, a motor for propelling a vehicle, a source of power for operating the motor to accelerate the vehicle, means for establishing dynamic braking connections for the motor to decelerate the vehicle, a pair of controllers for controlling the operation of the motor both during acceleration and deceleration of the vehicle, means for operating said controllers, means for so controlling said operating means that the controllers are operated in sequential relation, and relay means responsive to the motor voltage for causing said controllers to be returned to a predetermined position when the vehicle is at rest.

18. In a motor control system, in combination, a motor for propelling a vehicle, a source of power for the motor, switching means for connecting the motor to the power source to accelerate the vehicle, a master controller for controlling the operation of said switching means, switching means for establishing dynamic braking connections for the motor to decelerate the vehicle, and a controller for controlling the operation of said last-named switching means, said controllers being so connected that dynamic braking can be applied independently of the position of the master controller.

BASCUM O. AUSTIN.